Patented May 7, 1940

2,199,575

UNITED STATES PATENT OFFICE 2,199,575

BENZANTHRONE DERIVATIVES

Georg Rösch, Cologne-Deutz, Germany, assignor to General Aniline & Film Corporation, a corporation of Delaware No Drawing. Application December 22, 1937, Serial No. 181,201. In Germany December 24, 1936

9 Claims. (Cl. 260—352)

The present invention relates to a new process of preparing benzanthrone derivatives and to the new products obtainable thereby.

One object of my present invention is the development of a new process which can be applied generally for the preparation of benzanthrone derivatives. Another feature of my present invention resides in the preparation of new dyestuffs. Other objects of my invention will be apparent from the following description and claims:

It has been found that benzanthrone derivatives of the general formula:

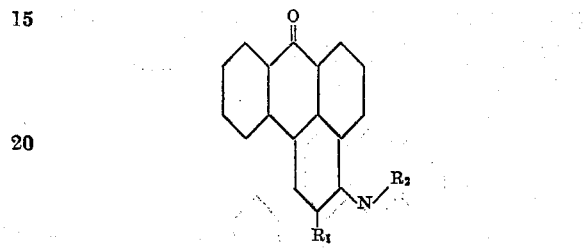

wherein $R_1$ stands for hydrogen or carboxylic acid, and $R_2$ stands for an aryl radical or a radical of a compound which is capable of being vatted, can be prepared by causing to react Bz-1-alkoxybenzanthrones with primary aromatic amines in the presence of caustic alkalies and of an indifferent solvent. It is to be understood that the expression "aromatic amines" comprises amines, as for instance, aniline or naphthylamine as well as aminobenzanthrones and aminoanthraquinones.

Most of the benzanthrone derivatives which are obtainable according to my present invention have not been described up to the present. This is due to the fact that there existed no general method for their preparation. It is surprising and could not be expected that according to the process of my present invention these compounds would be obtained because benzanthrone derivatives other than those indicated in my specification react in 2-position of the benzanthrone molecule with an aromatic amine. Suitable Bz-1-alkoxybenzanthrones as starting material are for instance Bz-1-methoxybenzanthrone, Bz-1-ethoxybenzanthrone and Bz-1-methoxybenzanthrone-Bz-2-carboxylic acid-methyl ester. As suitable aromatic amines there come into consideration amines of the benzene, naphthalene, diphenyl, benzanthrone and anthraquinone series. These amines may be substituted once or several times by other substituents, such as halogen, alkyl, alkoxy and carboxylic acid radicals. As amines of this kind there may be mentioned aniline, p-toluidine, o-chloroaniline, 2,4-dichloroaniline, o-anisidine, β-naphthylamine, Bz-1-aminobenzanthrone, Bz-2-aminobenzanthrone, α-aminoanthraquinone and β-aminoanthraquinone.

The reaction is preferably carried out in the presence of an indifferent solvent, such as pyridine, dimethylaniline, monomethylaniline or quinoline. Also an excess of the employed aromatic amine itself may be applied as solvent provided that it is in a liquid state under the reaction conditions. The amount of the caustic alkali used may vary to a far reaching extent; the temperature at which the reaction is carried out may vary too. The reaction starts at about 100° whereby the reaction mixture turns green.

Depending on the conditions the Bz-1-arylaminobenzanthrones are formed only intermediately and are instantaneously transformed into benzanthronehydroacridines, a heterocyclic ring being formed. The following formulae show these relations aniline being used as aromatic amine:

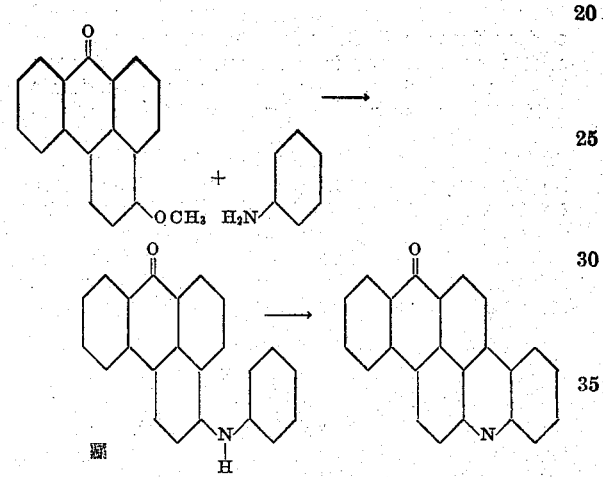

The formation of the heterocyclic ring is facilitated on the one hand by applying high temperatures, and, on the other hand by using special amines, such as β-naphthylamine, 2-aminobenzanthrone or aminoanthraquinones as starting material. It may be also carried out by melting the Bz-1-arylaminobenzanthrones first obtained with caustic alkalies.

The products according to the present invention are valuable as starting material for the formation of dyestuffs. Partly they are always dyestuffs depending on the nature of the aromatic amine being employed. Most of the compounds obtained show characteristic properties when treated with sulfuric acid. They dissolve with yellow to blue coloration and yield a characteristic yellow and red fluorescence. On diluting the sulfuric acid solution with water the color changes to blue and on further diluting the color of the compound itself is obtained. By chlorosulfonic acid and phosphorous oxychloride the compounds are dissolved with a blue color. If treating them with an alcoholic solution of potassium hydroxide under mild conditions a characteristic green shade is observed.

The following examples illustrate the invention without being restricted thereto, the parts being by weight:

Example 1

Equal parts of Bz-1-methoxybenzanthrone, aniline and caustic potash are heated to 120° with the tenfold quantity of pyridine while stirring for 2 hours. The green reaction mixture is introduced while stirring into dilute hydrochloric acid and the reddish-brown precipitate filtered by suction and washed with water. Small quantities of the Bz-1-hydroxy-benzanthrone formed by saponification are removed by boiling with dilute caustic soda lye. When recrystallizing from chlorobenzene the Bz-1-anilidobenzanthrone separates in red needles (M. P. 233–234°). It corresponds to the following formula:

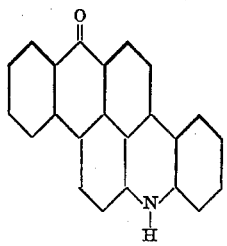

It dissolves in concentrated sulfuric acid with yellow color and yellow fluorescence. On diluting with some water a blue solution is obtained and on further diluting red flakes separate. The substance dissolves in chlorosulfonic acid with blue color with the formation of the sulfamic acid. When using phosphorus oxychloride as solvent also a blue solution is obtained. All of the Bz-1-benzanthronylamines described in the following examples show these last two reactions. On treating with alcoholic potash the Bz-1-anilidobenzanthrone turns green.

Instead of pyridine the same quantity of quinoline, monomethylaniline, dimethylaniline or an excess of aniline itself may be employed as solvent.

Example 2

Equal parts of Bz-1-methoxybenzanthrone, p-toluidine and caustic potash are treated with the tenfold quantity of pyridine and worked up as described in Example 1; Bz-1-toluido-benzanthrone of the formula:

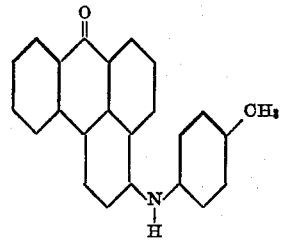

is thus obtained. When recrystallizing from chlorobenzene the Bz-1-toluidobenzanthrone separates in bluish-red needles (M. P. 236–237°). It dissolves in sulfuric acid with orange color and orange fluorescence. On diluting with water the product shows the same properties as described in Example 1.

Example 3

Equal parts of Bz-1-ethoxybenzanthrone and caustic potash are heated to boiling in the fivefold quantity of o-chloroaniline for a short time. The green melting is introduced while stirring into dilute hydrochloric acid, the reddish-brown precipitate is filtered with suction, washed, boiled in dilute caustic soda lye, again washed, dried and recrystallized from chlorobenzene. Orange dyed needles are thus obtained (M. P. 207–208°). The product corresponds to the following formula:

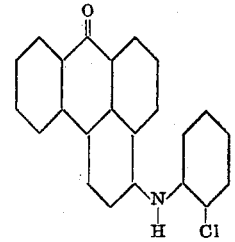

When dissolved in concentrated sulfuric acid it yields an orange color; on diluting with some water a blue solution is obtained and on further diluting red flakes separate.

Example 4

Equal parts of Bz-1-methoxybenzanthrone, o-anisidine and caustic potash are treated in the tenfold quantity of pyridine according to Example 1 and worked up. On recrystallizing from glacial acetic acid the Bz-1-o-methoxyanilidobenzanthrone separates in orange colored needles (M. P. 156–157°), having the following formula:

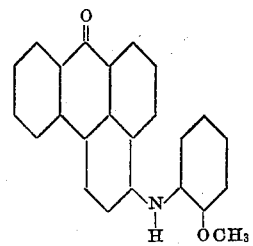

In concentrated sulfuric acid the color of the solution is orange to yellow with the same fluorescence. On diluting with water the solution turns blue and on further diluting red flakes separate.

Example 5

Equal parts of Bz-1-methoxybenzanthrone, β-naphthylamine and caustic potash are treated with the tenfold quantity of pyridine according to Example 1 and worked up. After being recrystallized from nitrobenzene the Bz-1-benzanthronyl-2-naphthylamine corresponding to the following formula:

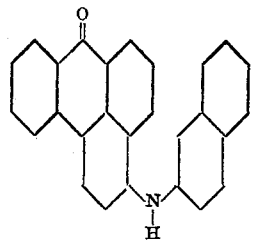

separates in violet needles (M. P. 282–283°). When dissolved in concentrated sulfuric acid the solution shows a red coloration. On diluting with a small quantity of water the solution turns blue, on further diluting violet flakes separate.

Example 6

10 parts of Bz-1-methoxybenzanthrone and 30 parts of caustic potash are introduced while stirring into a melting of 100 parts of β-naphthylamine at about 150°. The green melting is slowly heated to 240°, whereby the coloration turns bluish-red. Thereafter the melting is introduced into dilute hydrochloric acid, boiled, the dark precipitate is filtered with suction, washed and boiled with dilute caustic soda lye in order to dissolve some Bz-1-hydroxybenzanthrone formed during the reaction. The crude product is now boiled with alcohol of about 50% strength to which somewhat potash or caustic soda lye has been added. The benzanthronehydroacridine having the following formula:

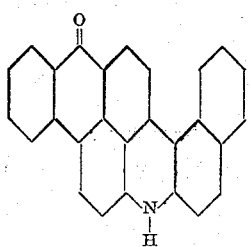

dissolves with bluish-red coloration and a magnificent orange colored fluorescence, whilst a small quantity of iso-dibenzanthrone also formed, and Bz-1-benzanthronyl-2-naphthylamine, which had not been closed to a ring, remain undissolved. The solution is filtered and the benzanthronehydroacridine is precipitated from the filtrate by the addition of water; the violet flakes are filtered with suction, washed with water and dried. The product may be recrystallized from at least the hundred-fold quantity of nitrobenzene; dark violet needles are thus obtained which do not melt even at 300°. The substance dissolves in concentrated sulfuric acid with a bluish-red coloration and a yellow fluorescence. On dissolving it in an alcoholic solution of alkali the substance shows a bluish-red color and an intense orange-colored fluorescence.

*Example 7*

10 parts of Bz-1-methoxybenzanthrone, 10 parts of Bz-1-aminobenzanthrone and 20 parts of caustic potash are heated to boiling in 200 parts of pyridine during 4-6 hours while stirring. The reaction mixture is then introduced in dilute hydrochloric acid, the dark precipitate is filtered with suction, washed, boiled with dilute caustic soda lye, and boiled with glacial acetic acid, in order to purify the mixture. Thus the dibenzanthronylamine of the formula:

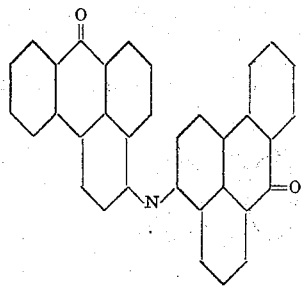

is obtained as a violet powder. It remains unmelted at 300° and dissolves in concentrated sulfuric acid with brown coloration; on heating with bluish-green, and in chlorosulfonic acid with blue coloration, sulfamic acid being formed.

*Example 8*

(a) 25 parts of Bz-2-aminobenzanthrone, 26 parts of Bz-1-methoxybenzanthrone and 50 parts of caustic potash are heated to boiling in the tenfold quantity of pyridine for two hours while stirring. The solution becomes green and a green precipitate is separated which is filtered with suction, washed and boiled with glacial acetic acid. On recrystallizing from nitrobenzene the dibenzanthronylamine of the formula:

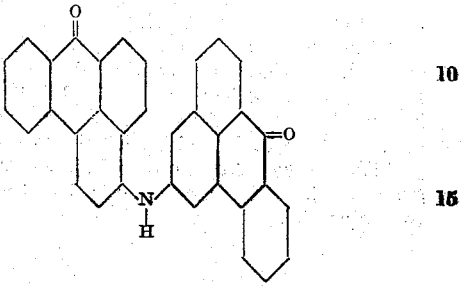

is obtained in violet crystal dregs, which remain unmelted even at 300° and which dissolve in concentrated sulfuric acid with orange coloration.

(b) 5 parts of the Bz-1-Bz-2'-dibenzanthronylamine obtained according to Example 8a are introduced into a melting of 50 parts of caustic potash and 50 parts of alcohol at 120°. This temperature is kept for a short time while stirring. The green melting immediately becomes bluish-red. The mixture is introduced in water and the dark precipitate is filtered with suction, washed and dried. The new substance has the following formula:

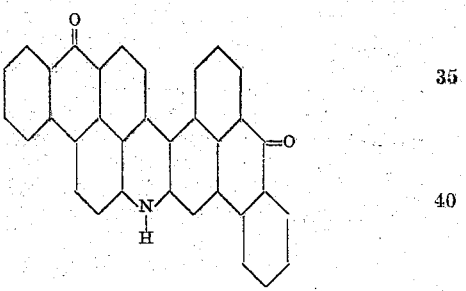

dissolves in concentrated sulfuric acid with bluish-red coloration and yields a bluish-red vat. Cotton is dyed violet shades. After exposure to the air a bluish-grey is obtained which, due to the amphoteric character of the NH-group turns to red when treated with alkalies and to olive when treated with acids.

*Example 9*

(a) 52 parts of Bz-1-methoxybenzanthrone, 45 parts of β-aminoanthraquinone and 100 parts of caustic potash are heated to boiling during 2 hours in 500 parts of pyridine. A green precipitate separates from the green solution, which is filtered with suction and washed. For purifying the precipitate it is boiled with glacial acetic acid. A violet powder is thus obtained which can be recrystallized from nitrobenzene, having the following formula:

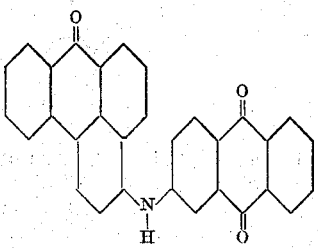

The new substance remains unmelted at 300° and dissolves in concentrated sulfuric acid with blue coloration.

(b) 5 parts of Bz-1-benzanthronyl-2-anthraquinonylamine obtained according to Example 9a are introduced at about 140° into a melting of 50 parts of caustic potash and 50 parts of alcohol, and stirred for a short time at 160°. The green melting turns brown and soon a dark precipitate separates. The mixture is stirred into water, filtered with suction, washed, dried and boiled in nitrobenzene. The product dissolves in concentrated sulfuric acid with brown coloration, yields an olive colored vat and dyes cotton bluish-grey shades. It corresponds to the following formula:

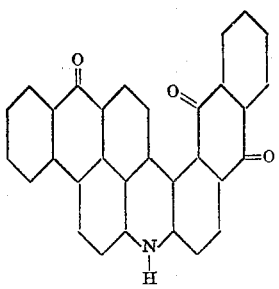

On methylating with p-toluenesulfonic acid methylester in boiling nitrobenzene and in the presence of potassium carbonate olivish-grey needles of the N-methyl compound are obtained. It dissolves in concentrated sulfuric acid with brown shades, yields a reddish-brown vat and dyes cotton olivish-grey shades.

From Bz-1-methoxybenzanthrone and 2-amino-3-chloranthraquinone Bz-1-benzanthronyl-2-chloro-(3)-anthraquinonylamine, the corresponding hydroacridine and its N-methyl-derivative are obtained in the same manner.

*Example 10*

10 parts of Bz-1-methoxybenzanthrone, 10 parts of α-aminoanthraquinone and 10 parts of caustic potash are heated to boiling during 2 hours in 100 parts of pyridine. From the solution separates a precipitate which is filtered with suction and washed. The dark precipitate thus obtained is exhaustively extracted with boiling pyridine. Bz-1-benzanthronyl-1-anthraquinonylamine separates from the filtrate as a brown precipitate, which has the following formula:

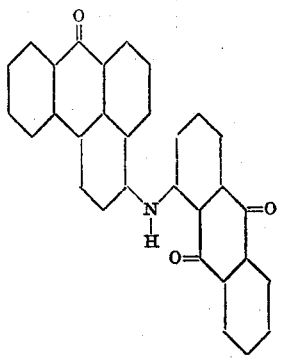

It dissolves in concentrated sulfuric acid with reddish-brown coloration. On diluting with a small quantity of water the solution turns blue, on further diluting reddish-brown flakes separate.

By the action of an alcoholic potash melting the known dyestuff according to the following formula:

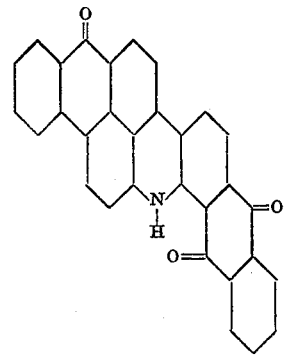

is obtained.

*Example 11*

64 parts of Bz-1-methoxybenzanthrone-Bz-2-carboxylic acid methyl ester, 64 parts of 2.4-dichloroaniline and 100 parts of caustic potash are heated to boiling in 640 parts of pyridine for ½ hour while stirring. The green solution is introduced into dilute hydrochloric acid while stirring, the reddish-brown precipitate is filtered with suction, washed, dried and, for purifying it, boiled with nitrobenzene, in which the new substance is insoluble and becomes crystalline. It has the following formula:

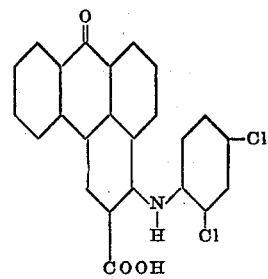

It dissolves in concentrated sulfuric acid with orange coloration and orange fluorescence.

*Example 12*

64 parts of Bz-1-methoxybenzanthrone-Bz-2-carboxylic acid methyl ester, 45 parts of α-aminoanthraquinone and 100 parts of caustic potash are heated to boiling while stirring for ½ hour in 640 parts of pyridine. The reaction mixture first becomes green and then brown, and after filtration a green precipitate remains. This precipitate is washed and, for purifying, boiled with nitrobenzene. A bluish-green powder, the benzanthronehydroacridine of the formula:

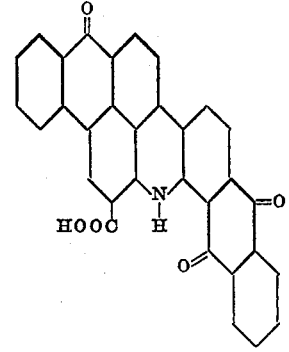

is obtained. It dissolves in concentrated sulfuric acid with green coloration and with red fluorescence and dyes from the violetish-blue vat olivish-green shades.

I claim:

1. The process which comprises causing to react Bz-1-alkoxybenzanthrones with a primary aromatic amine in the presence of a caustic alkali and of a basic organic solvent.

2. The process which comprises causing to react Bz-1-methoxybenzanthrones with a primary aromatic amine in the presence of a caustic alkali and of a basic organic solvent.

3. The process which comprises causing to react methoxybenzanthrones selected from the group consisting of Bz-1-methoxybenzanthrone, Bz-1-methoxybenzanthrone-Bz-2-carboxylic acid and esters thereof, with a primary aromatic amine in the presence of a caustic alkali and of a basic organic solvent.

4. The process which comprises causing to react methoxybenzanthrones selected from the group consisting of Bz-1-methoxybenzanthrone, Bz-1-methoxybenzanthrone-Bz-2-carboxylic acid and esters thereof, with a primary amine of a compound which is capable of being vatted in the presence of a caustic alkali and of a basic organic solvent.

5. The process which comprises causing to react Bz-1-alkoxybenzanthrones with a primary aromatic amine in the presence of a caustic alkali and of a basic organic solvent and melting the products thus obtained with caustic alkalies.

6. The process which comprises causing to react Bz-1-methoxybenzanthrones with a primary aromatic amine in the presence of a caustic alkali and of a basic organic solvent and melting the products thus obtained with caustic alkalies.

7. The process which comprises causing to react methoxybenzanthrones selected from the group consisting of Bz-1-methoxybenzanthrone, Bz-1-methoxybenzanthrone-Bz-2-carboxylic acid and esters thereof, with a primary aromatic amine in the presence of a caustic alkali and of a basic organic solvent, and melting the products thus obtained with caustic alkalies.

8. The process which comprises causing to react methoxybenzanthrones selected from the group consisting of Bz-1-methoxybenzanthrone, Bz-1-methoxybenzanthrone-Bz-2-carboxylic acid and esters thereof, with a primary amine of a compound which is capable of being vatted in the presence of a caustic alkali and of a basic organic solvent, and melting the products thus obtained with caustic alkalies.

9. The products of the general formula:

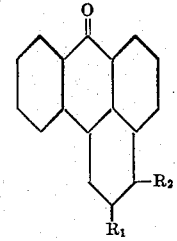

wherein $R_1$ stands for a member selected from the group consisting of hydrogen and carboxylic acid and $R_2$ stands for a substituted amino group selected from the group consisting of aniline, toluidine, naphthylamine, Bz-benzanthronylamine and β-anthraquinonylamine.

GEORG RÖSCH.